United States Patent [19]

Gellert

[11] 4,212,626

[45] Jul. 15, 1980

[54] STACK INJECTION MOLDING MELT TRANSFER SYSTEM

[76] Inventor: Jobst U. Gellert, 11 Newton Rd., Brampton, Ontario, Canada

[21] Appl. No.: 970,388

[22] Filed: Dec. 18, 1978

[51] Int. Cl.² .................................................. B29F 1/05
[52] U.S. Cl. ...................................... 425/562; 264/328; 425/572; 425/DIG. 229
[58] Field of Search ................ 264/328; 425/562, 563, 425/572, DIG. 229

[56] References Cited

U.S. PATENT DOCUMENTS 2,992,455  7/1961  Salzman .............................. 425/562

Primary Examiner—Thomas P. Pavelko
Attorney, Agent, or Firm—George H. Riches & Associates

[57] ABSTRACT

This invention relates to injection molding and particularly to a melt transfer system for stack molding. According to the invention, a novel combination of known melt flow control valve units are arranged and operated to control the flow of pressurized melt from the stationary platen adjacent the molding machine to a manifold in the center moving platen. One control valve unit is located in the stationary platen in alignment with another control valve unit located in the moving platen. When the moving platen is in the closed position adjacent the stationary platen, the gates of the two control valve units abut and when the valve pins of the two control valve units are actuated to the open position, pressurized melt will flow through the gates from the stationary platen to the moving platen. The hot runner passage extends from the molding machine through the control valve unit located in the stationary platen. Through the gates into the control valve unit located in the moving platen, and then through the manifold system to the cavities located on opposing faces of the moving platen. In a second embodiment, a first cavity is located between the above two gates, and a third control valve unit is located in the moving platen in abutting alignment with the second control valve unit and its gate extends to a second cavity of the opposite face of the moving platen.

3 Claims, 4 Drawing Figures

STACK INJECTION MOLDING MELT TRANSFER SYSTEM

BACKGROUND OF THE INVENTION

This invention relates generally to injection molding and, more particularly, to a new valve gated melt transfer system for stack molding.

Stack molding provides the advantage that it enables the machine output to be doubled without increasing its size. The location of the cavities on opposing faces of the moving center section or platen makes this possible because the same machine forces are applied to two cavities in series rather than to a single cavity or parting line. However, stack molding has the disadvantage that the melt runner system must extend through the moving center platen to reach the cavities.

In the past, the melt has been conveyed across the first parting line between the stationary platen adjacent the molding machine and the moving platen by a heated sprue tube or bar through the stationary platen from the machine nozzle across to the moving center platen. This structure has the disadvantages that the heated tube is is the way when the mold is open and damages falling parts. Insulating it takes space and thereby reduces the number of cavities possible on the first parting line. Furthermore, when the heated tube loses contact with the machine nozzle, melt drools out and provides undesirable air entry into the system. In addition, the melt conveying passage is longer because it has to cross the opening when the mold is open, thus resulting in higher pressure drop.

SUMMARY OF THE INVENTION

Accordingly, it is an object of the present invention to at least partially overcome these disadvantages by providing an improved stack molding melt transfer system using a combination of known valve gate units to control the flow of melt to the center moving platen.

To this end, in one of its aspects, the invention provides stack injection molding apparatus for conducting pressurized melt to a moveable platen which is actuated between an open and a closed position comprising a first melt flow control valve unit securely located in a stationary platen, said first flow control valve unit having a molding machine inlet and a first controlled gate, said molding machine inlet and said first controlled gate being connected by a first runner passage, and a second melt flow control valve unit securely located in the moveable platen, said second flow control valve unit having a second controlled gate and a second runner passage extending from said second controlled gate, said second flow control valve unit being located in said moveable platen in a position wherein said first and second controlled gates are in conducting communication when the moveable platen is in the closed position, said flow control valve units being actuated to open and then close both of said gates while the moveable platen is in the closed position to provide a flow of pressurized melt from the first runner passage to the second runner passage.

In another of its aspects, the invention further provides a method of stack injection molding using a mold having a plurality of cavities located on first and second parting lines, the first parting line extending between a stationary platen and a first moveable platen, the second parting line extending between said first moveable platen and a second moveable platen, the stationary platen having a first flow control valve unit which has a first runner passage extending from a molding machine inlet to a first controlled gate, the first moveable platen having a second flow control valve unit which has a second runner passage extending from a second controlled gate to communicate with said cavities, comprising the steps of repeatedly closing the mold along said first and second parting lines to form said cavities, said first and second controlled gates being in an abutting aligned relationship in this closed position, actuating said first and second flow control valve units to open said first and second controlled gates to provide for the flow of pressurized melt from the molding machine through said first runner passage through said open gates and through said second runner passage into said cavities, actuating said first and second flow control valve units to close said first and second controlled gates, and then opening the mold along said first and second parting lines to eject the molded parts after the melt has set.

Further objects and advantages of the invention will appear from the following description taken together with accompanying drawings.

DESCRIPTION OF THE PREFERRED EMBODIMENTS

Figure 1:
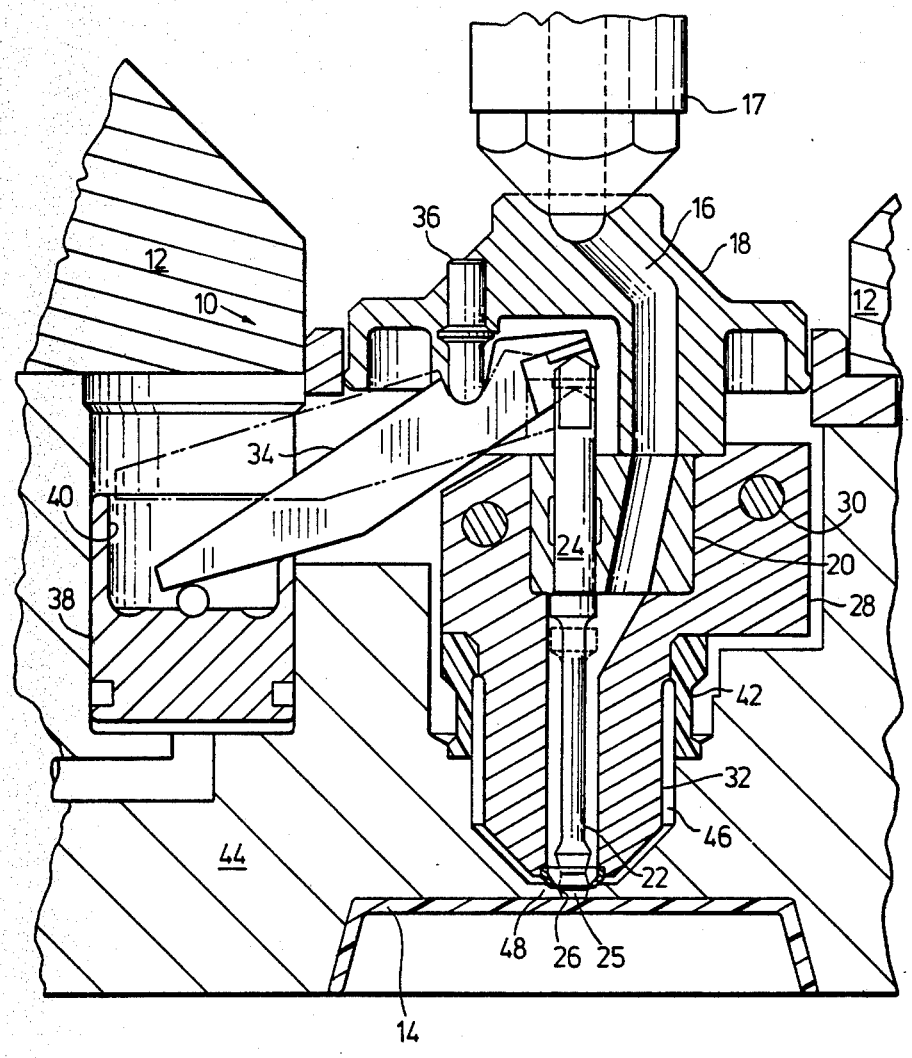
FIG. 1 is a partial sectional view of a known melt flow control valve unit.

Reference is first made to FIG. 1 which shows a known melt flow control valve unit 10 positioned and screw mounted between a molding machine 12 and a cavity 14. A hot runner passage 16 extends from the nozzle 17 of the machine 12 through the back plate 18, through bushing seal 20, past the stem 22 of the valve pin 24, through the gate 26 and into the cavity 14. The heater cast 28 formed of beryllium copper has a electrical heating element 30 and a nozzle portion 32. The valve pin 24 is actuated to its closed position with its tip 25 seated in the gate 26 by the rocker arm 34 which is pivoted on rounded pin 36 seated in the back plate 18 by piston 38 which reciprocates in pneumatic cylinder 40. The heater cast 28 is held in position by insulation bushing 42 and spaced from the cavity plate 44 by air gap 46. A nozzle seal 48 extends across the air gap 46 adjacent the gate 26.

Figure 2:
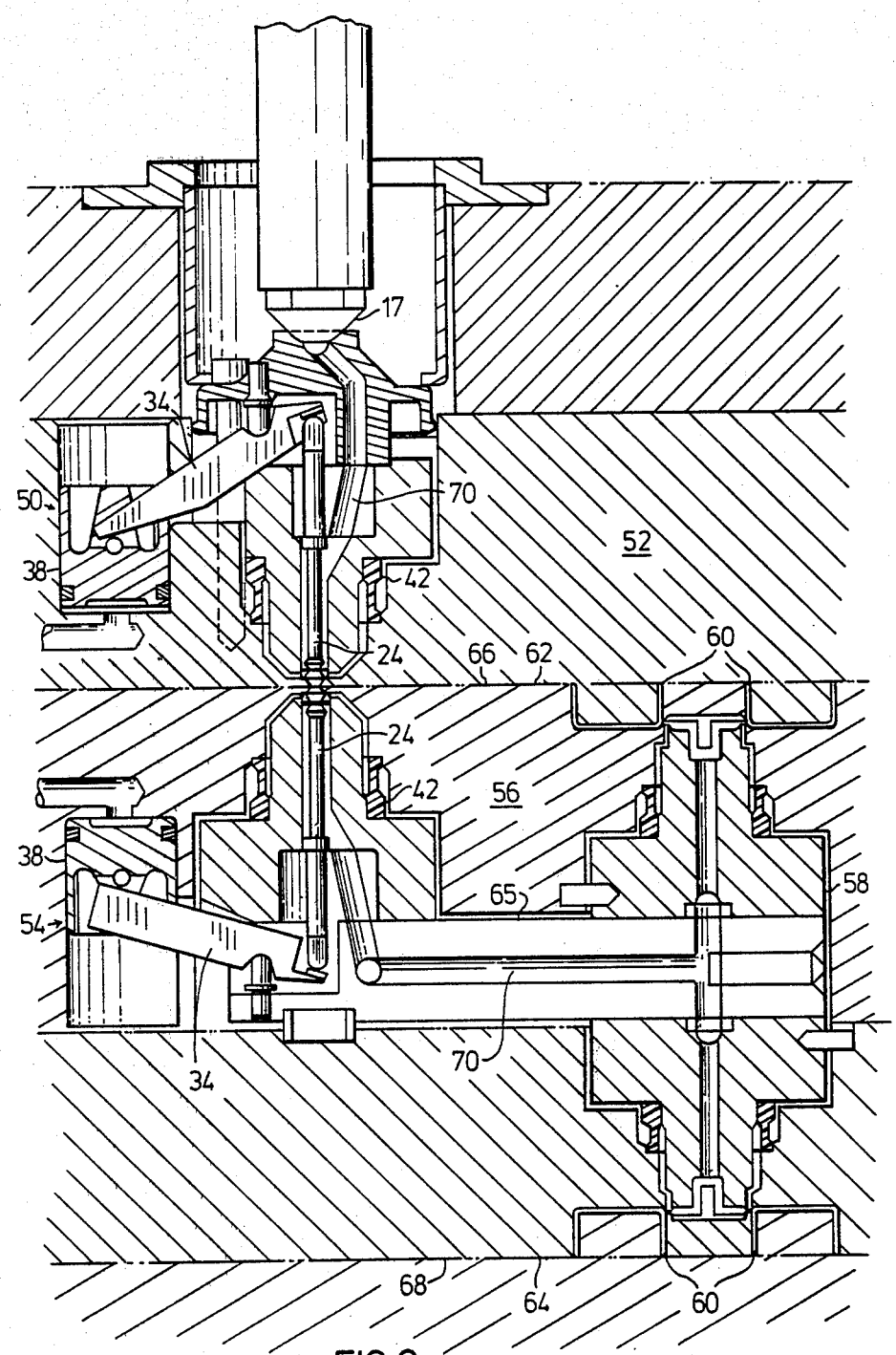
FIG. 2 is a sectional view illustrating apparatus according to a first embodiment of the invention, shown in the closed position.

Referring now to FIG. 2, it illustrates a stack molding system using a combination of melt flow control valve units according to a first embodiment of the invention. Each control valve unit is of the known type described above in regard to FIG. 1 and therefore the same reference numerals will be used in referring to their components, when applicable. As may be seen a first melt flow control valve unit 50 is located in the stationary platen 52 adjacent the molding machine 12 and a second melt flow control valve unit 54 is located in the central moving platen 56. The moving platen 56 has a manifold system 58 which extends to a plurality of cavities 60 located on opposing parting faces 62, 64 of the moving platen 56. Both control valve units are the same except that in the second 54, the back plate is replaced by a portion of the manifold plate 65. The moving platen 56 is reciprocated between an open position and the closed position shown, in which one parting face 62 of the moving platen 56 meets the stationary platen 52 along a first parting line 66 while the other parting face 64 meets a second moving platen (not shown) along a second parting line 68. The first and second melt flow control valve units 50, 54 are located in the stationary platen 52 and moving platen 56 respectively so that their gates are in abutting alignment in this closed position.

In use, the central moving platen 56 is actuated away from the stationary platen 52 to the open position to eject the previously formed product and then returned to the closed position. The hot runner passage 70 extends from the molding machine nozzle 17, through the first melt flow control valve unit 54, through the second melt flow control valve unit 54, through the manifold system 58 in the moving platen 56 and is, in this embodiment edge gated into the cavities 60. The rocker arms 34 of both control valve units 50, 54 are pneumatically actuated by the pistons 38 to their open positions which releases the pressure on the valve pin allowing the pressurized melt to open them and flow past the tip of the valve pin and out the gate of the first control valve unit 50 and into the abutting gate of the second control valve unit 54. After the cavities 60 are filled, the pistons 38 of the respective control valve units are actuated to force the valve pins 24 to their closed positions seated in their respective gates with their tips 25 abutting on the first parting line 66. After a period of time has passed sufficient to allow the molded parts to set, the moving platen 56 is actuated to the open position to eject the parts and the closed control valve units prevent leakage or drooling of the melt. The moving platen 56 is then returned to the closed position and the pressure to the pistons 38 is relieved to allow the valve pins to return to their open positions under the melt pressure to all the melt to flow through the runner passage 70 to the cavities 60. This process may be repeated at speeds up to about twenty times per minute and a large number of cavities may be fed from the manifold system 58 in the moving platen 56.

Figure 3:
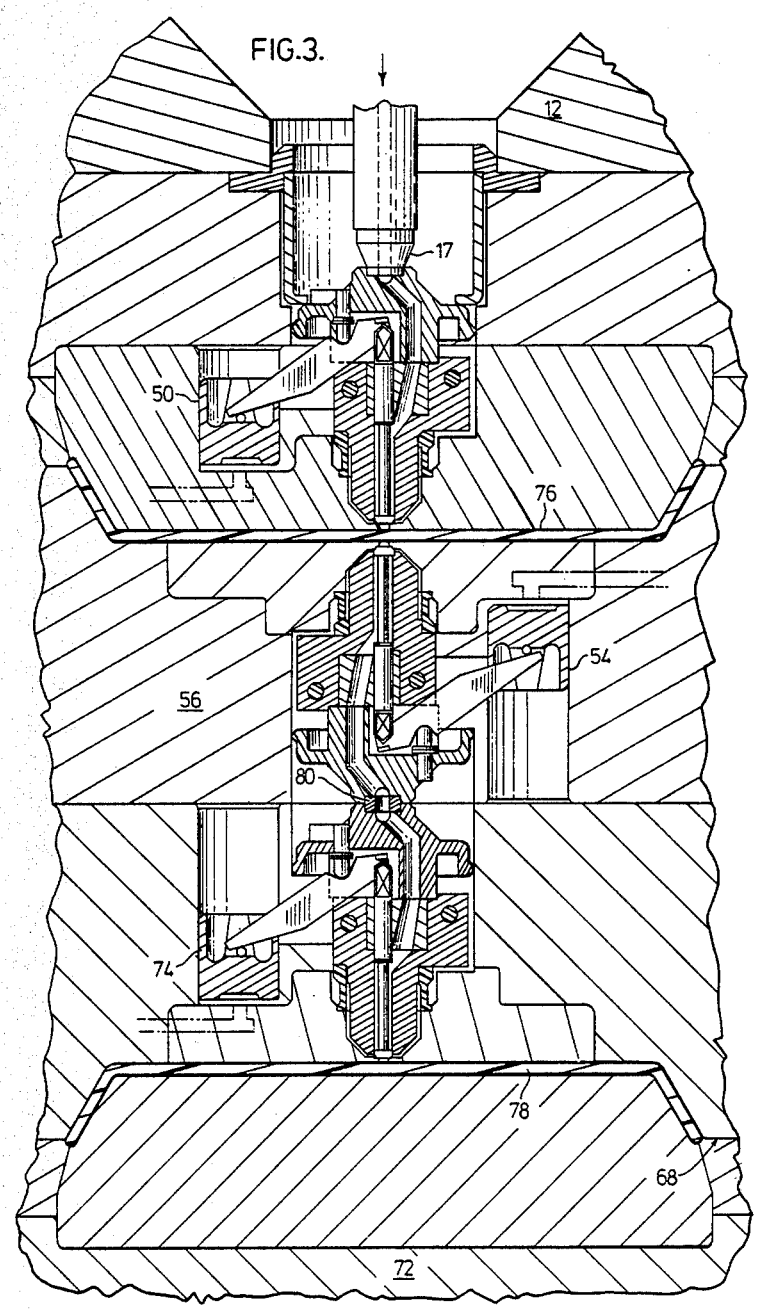
FIG. 3 is a sectional view illustrating apparatus according to a second embodiment of the invention, shown in the closed position.
Figure 4:
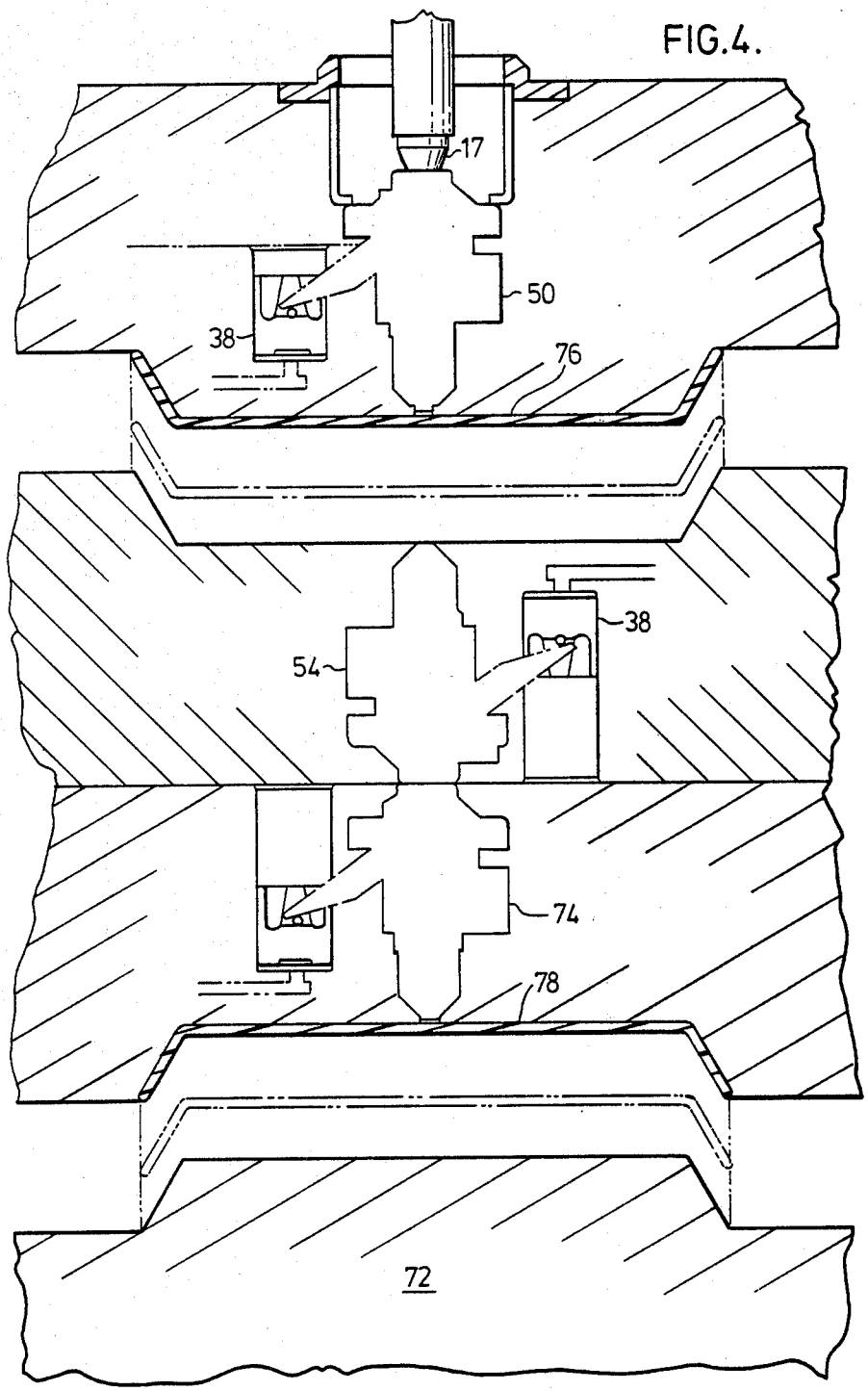
FIG. 4 is a sectional view illustrating the apparatus according to the second embodiment of the invention, shown in the open position.

FIGS. 3 and 4 illustrate another stack molding system using apparatus according to a second embodiment of the invention. In this embodiment, the components of the melt flow control valve units are again similar to those described in regard to FIG. 1 and therefore, the same reference numerals will again be used in referring to them, when appropriate. In this system, there is a stationary platen 52, a first moving platen 56 and a second moving platen 72 which is shown in FIG. 4, and the first control valve unit 50 is again located in the stationary platen 52. The second control valve unit 54 is also located in the moving platen 56, but in addition, a third melt flow control valve unit 74 is located in the first moving platen 56 in abutting, but opposed relationship to the second control valve unit 54. Furthermore, while the gates 26 of the first and second control valve units 50, 54 are in alignment when the moving platens are in the closed position, the gates are spaced across a first cavity 76 located along the first parting line 66 between the stationary platen 52 and the first moving platen 56. The third melt flow control valve unit 74 is located with its gate extending to a second cavity 78 located on the second parting line 68 between the first and second moving platens 56, 72 and the other end of the third control valve unit 74 abuts on the second control valve unit at locating and sealing ring 80. The hot runner passage 70 extends from the nozzle 17 of the molding machine 12 through the first control valve unit 50, across the first cavity 76, through the second and third control valve units 54, 74 and into the second cavity 78.

In use, with the moving platens in the closed position shown in FIG. 3, the air pressure to the pistons 38 of all three control valve units is released to allow the valve pins to move to their open positions under the pressure of the melt. The melt then flows through the hot runner passage 70 and fills the first and second cavities 76, 78. After the cavities are filled the pistons 38 of all the control valve units are actuated to return the valve pins 24 to their closed positions with their tips seated in their respective gates. After the parts have set, the moving platens are opened to eject the parts and then returned to their closed positions, and the process is repeated.

Although this invention has been described in respect to two particular embodiments, it is not to be construed in a limiting sense. Many variations and modifications will now occur to those skilled in the art. In particular, it will be apparent that the invention is not limited to the use of these particular control valve units.

What I claim is:

1. Stack injection molding apparatus for conducting pressurized melt to a moveable platen which is actuated between an open and a closed position comprising:
    (a) a first melt flow control valve unit securely located in a stationary platen, said first flow control valve unit having a molding machine inlet and a first controlled gates, said molding machine inlet and said first controlled gate being connected by a first runner passage, and
    (b) a second melt flow control valve unit securely located in the moveable platen, said second flow control valve unit having a second controlled gate and a second runner passage extending from said second controlled gate, said second flow control valve unit being located in said moveable platen in a position wherein said first and second controlled gates are in conducting communication when the moveable platen is in the closed position,
    said flow control valve units being actuated to open and then close both of said gates while the moveable platen is in the closed position to provide a flow of pressurized melt from the first runner passage to the second runner passage.

2. Stack injection molding apparatus as claimed in claim 1 wherein said first and second controlled gates are in abutting alignment when the moveable platen is in the closed position, and wherein the second runner passage communicates with a plurality of cavities located on opposing parting faces of the moveable platen.

3. Stack injection molding apparatus as claimed in claim 1 wherein said first and second controlled gates are in communication through a first cavity formed between the stationary platen and the moveable platen when the moveable platen is in the closed position, and further comprising:
    (c) a third melt flow control valve unit securely located in the moveable platen in a abutting opposed relationship to said second flow control valve unit, said second flow control valve unit having a third runner passage in communication with the second runner passage of said second flow control valve unit, the third runner passage extending to a third controlled gate leading to a second cavity located opposite to said first cavity.

* * * * *